(12) United States Patent
Lajeunesse

(10) Patent No.: US 6,220,049 B1
(45) Date of Patent: Apr. 24, 2001

(54) DUAL-ACCESS REFRIGERATOR

(75) Inventor: Marc Lajeunesse, Lake Mary, FL (US)

(73) Assignee: Insta Freeze, LLC

( * ) Notice: Subject to any disclaimer, the term of this patent is extended or adjusted under 35 U.S.C. 154(b) by 0 days.

(21) Appl. No.: 09/421,682

(22) Filed: Oct. 20, 1999

(51) Int. Cl.[7] .................................................. F25D 11/00
(52) U.S. Cl. ............................................. 62/440; 312/287
(58) Field of Search ........................... 62/440, 441, 239, 62/244; 312/287; 220/592.02; 180/89.1, 89.11; 296/37.1, 190.11

(56) References Cited

U.S. PATENT DOCUMENTS

| | | | |
|---|---|---|---|
| 2,811,405 | * 10/1957 | Formoso | 312/287 |
| 3,086,830 | * 4/1963 | Malia | 312/287 |
| 4,314,602 | * 2/1982 | Frederick | 220/592.2 |

\* cited by examiner

*Primary Examiner*—Corrine McDermott
*Assistant Examiner*—Mohammad M Ali
(74) *Attorney, Agent, or Firm*—McHale & Slavin

(57) ABSTRACT

A dual-access refrigerator includes a main housing characterized by an internal compartment and having a first side wall spaced apart from a second side wall by a top wall, and a bottom wall. Front and rear movable panels selectively provide access to the internal compartment. A cooling assembly selectively maintains a temperature of the internal compartment. In one embodiment, the rear access panel cooperates with a refrigerator access panel associated with a host vehicle. A refrigerator access aperture disposed within the vehicle side wall allows access to the refrigerator rear access panel. The refrigerator access aperture may selectively be closed by refrigerator access panel. Moving the refrigerator access panel reveals the refrigerator rear access panel, which may be opened to retrieve refrigerated items. In another embodiment, the rear access panel is eliminated, and the rear access aperture is sealed directly by the refrigerator access panel associated with the host vehicle side wall.

3 Claims, 4 Drawing Sheets

DUAL-ACCESS REFRIGERATOR

FIELD OF THE INVENTION

This invention is directed to refrigerators and, in particular, to a dual-access refrigerator for use with a recreational vehicle to provide access to refrigerated items from two separate locations.

BACKGROUND OF THE INVENTION

Recreational vehicles, such as motor homes and conversion vans, allow the occupants to explore while in the comforts of a self-contained vehicle. One of the benefits of traveling in this type of self-contained vehicle is the inclusion of various creature comforts such as air conditioning, stereo sound systems, televisions, comfortable bedding, showers, and refrigerators. Small refrigerators are used to keep perishable food fresh and beverages cold. Larger refrigerators include secondary compartments that allow storage of frozen goods.

Although the refrigerator is a step forward in the field of perishable food transportation, known versions of this device produce logistical hurdles in many settings. For instance, recreational vehicles are commonly driven to sporting events, allowing individuals to hold pre-game tailgate parties, in which a variety of foods and beverage are enjoyed. With existing refrigerators, each time an individual requires a refrigerated item, the individual would need to enter the vehicle to retrieve the desired item. This type of activity can distract the individual from the festive nature of the tailgate party. Additionally, this type of activity places a severe strain on the air conditioning system of the vehicle, because conditioned air leaks out of the vehicle each time the main door is opened and the refrigerator loses cold air each time the front panel is opened. This situation leads to accelerated wear and tear on the vehicle.

Should the recreational vehicle be used in a campground, an individual should not have be concerned about cleaning his feet, accidentally letting out a dog, waking a sleeping occupant, or allowing mosquitoes to enter the vehicle, simply to retrieve a cooled beverage or snack.

A refrigerator that would eliminate the need for an individual to enter the host vehicle to retrieve refrigerated items would represent a major advancement in the field of recreational vehicle use, in general.

Thus, what is needed is a dual-access refrigerator that allows access to stored items in a conventional manner and through the wall of a host vehicle, from outside the vehicle.

SUMMARY OF THE INVENTION

The instant invention is based on a refrigerator especially suited for use with recreational vehicles. The refrigerator of the present invention allows conventional access and supplemental rear access through the wall of a host recreational vehicle. In particular, the refrigerator is adapted to cooperate with the host recreational vehicle so that the supplemental rear access is possible from outside the host vehicle.

The device includes a main housing having an internal compartment bounded by a movable front access panel or door. The front access panel is hinged to the front of the main housing. The rear of the main housing is characterized by a rear access aperture which may span the entire rear face of the housing or may disposed within a rear wall. The rear access aperture is covered by a hinged rear access panel. Moving the rear access panel provides direct access to the refrigerator internal compartment.

In one embodiment, the refrigerator is used with a host vehicle having a refrigerator access aperture disposed with a vehicle side wall. The refrigerator main housing is positioned so that the rear access aperture is aligned with the refrigerator access aperture. This arrangement places the refrigerator access panel in close proximity with the refrigerator rear access panel. As a result, the refrigerator internal compartment may be accessed from outside the host vehicle by opening the rear access panel, through the refrigerator access aperture. Opening the rear access panel provides direct access to the refrigerator internal compartment.

In a second embodiment, the host vehicle includes a refrigerator access aperture that is selectively covered by a movable refrigerator access panel. The refrigerator main housing is positioned so that the rear access aperture is aligned with the refrigerator access aperture, placing the refrigerator access panel in close proximity with the refrigerator rear access panel. With this arrangement, the refrigerator internal compartment may be accessed from outside the host vehicle by opening the refrigerator access panel to expose the rear access panel. The rear access panel may then be opened to provide direct access to the refrigerator internal compartment.

In a third embodiment the refrigerator main housing is constructed without a rear access panel, and the host vehicle refrigerator access panel seals the rear access aperture directly. In this embodiment, a contoured sealing partition extends from the perimeter of the rear access aperture to the interior of the vehicle side wall, providing a thermal seal between the refrigerator internal compartment and the refrigerator access panel. The refrigerator access panel of this embodiment is preferably insulated.

Thus, it is an objective of the instant invention to provide a dual-access refrigerator that allows access to stored items in a conventional manner and through the wall of a host vehicle, from outside the vehicle.

An additional objective of the instant invention to provide a dual-access refrigerator that eliminates the need to enter a vehicle to retrieve a refrigerated item.

Yet another objective of the instant invention to provide a dual-access refrigerator that allows access from another room, e.g. a bedroom.

Still a further objective of the instant invention to provide a dual-access refrigerator that includes a remotely located cooling apparatus.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
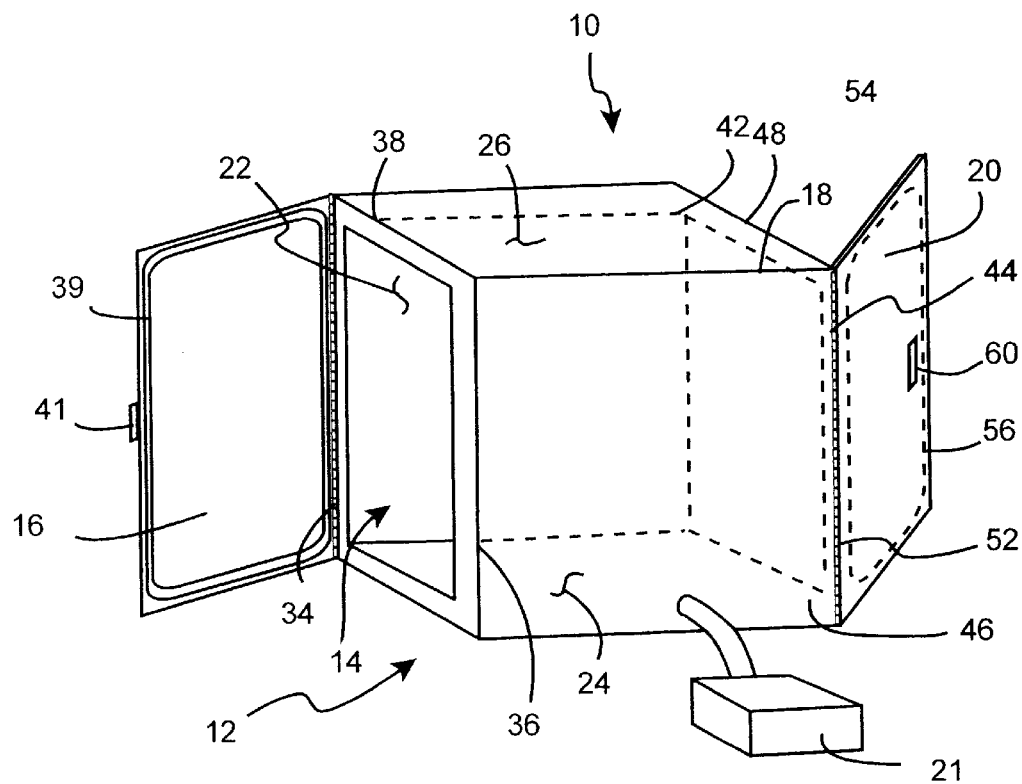
FIG. 1 is a perspective view of the refrigerator of the present invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now, with reference to FIG. 1, the dual-access refrigerator device 10 of the present invention will be described. By way of overview, the device 10 includes a main housing 12 having an internal compartment 14, a movable front access panel 16 to selectively provide access to the internal compartment, and a rear access aperture 18. The rear access aperture 18 is selectively sealed by a rear access panel 20 movably attached to the main housing 12; the rear access panel provides supplementary access to the internal compartment 14. A cooling means 21 is also provided to adjustably maintain the internal compartment 14 at a desired temperature. The cooling means 21 may be located remote from the main housing 12.

The main housing 12 of the dual-access refrigerator device 10 of the present invention includes a first side wall 22 spaced apart from a second side wall 24 by a top wall 26, and a bottom wall 28. The movable front access panel 16 selectively covers a front access aperture 32 and allows selective access to the internal compartment 14. In a preferred embodiment, the front access panel 16 is sized to extend between the first and second side wall front edges 34,36 and span from the top wall front edge 38 to the bottom wall front edge 40. With continued reference to FIG. 1, the front access panel 16 is preferably an insulated door hingedly attached to the first side wall front edge 34. It is noted that the front access panel 16 may also be attached to any of the housing front edges. A front sealing gasket 39 provides a thermal seal between the front access panel 16 and the internal compartment 14. A front handle 41 facilitates opening and shutting of the front access panel 16.

Figure 3:
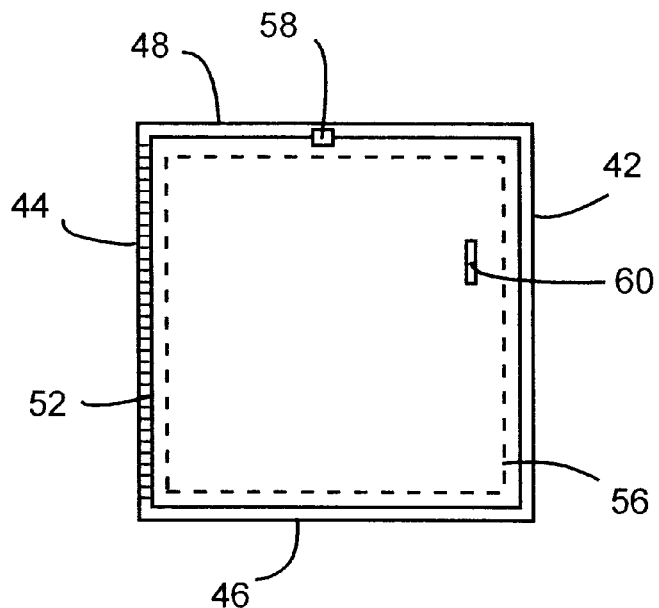
FIG. 3 is a rear elevation view of the refrigerator of FIG. 1.

As seen in FIG. 3, the rear access aperture 18 of the main housing 12 extends from a first side wall rear edge 42 to a second side wall rear edge 44, spanning from a bottom wall rear edge 46 to a top wall rear edge 48. The internal compartment 14 may be reached by opening the rear access panel 20. The rear access panel 20 is an insulated door hingedly attached to the housing rear access aperture 18. The rear access panel 20 is adapted to open along a vertical linking hinge 52 disposed along a left side edge 50 of the rear access aperture 18. It is noted that the rear access panel 20 may also be attached to the other edges of the rear access aperture 18, as desired. A rear sealing gasket 56 provides a thermal seal between the rear access panel 20 and the internal compartment 14. A rear access panel securing lock 58 may be used to prevent unwanted opening of the rear access panel 20. A rear access panel handle 60 facilitates opening and shutting of the rear access panel 20.

With this arrangement, the present invention provides a refrigerator device 10 that may advantageously be accessed from the front and rear. As a result, the present invention is well-suited for use with a host vehicle 62, such as a motor home or conversion van, in keeping with the objectives of the present invention.

Figure 2:
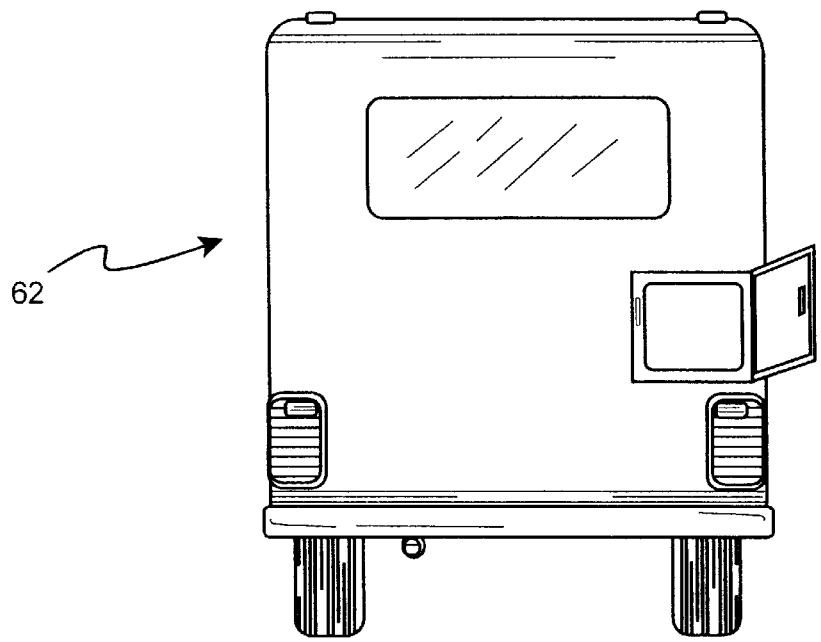
FIG. 2 is a pictorial view of the refrigerator of FIG. 1, shown in use with a host vehicle.

With reference to FIG. 2, the dual-access refrigerator device 10 of the present invention is shown in use within a motor home 62 having a refrigerator access aperture 64 disposed within a vehicle side wall 66. The refrigerator access aperture 64 is sized to accommodate the refrigerator rear access panel 20. The main housing is preferably positioned so that the rear access aperture 18 and rear access panel 20 are substantially aligned with the refrigerator access aperture 64. With this arrangement, the refrigerator internal compartment 14 may be accessed from outside the host vehicle 62 by reaching through the refrigerator access aperture 64 to open the rear access panel 20, thereby providing access to the refrigerator internal compartment 14.

Figure 5:
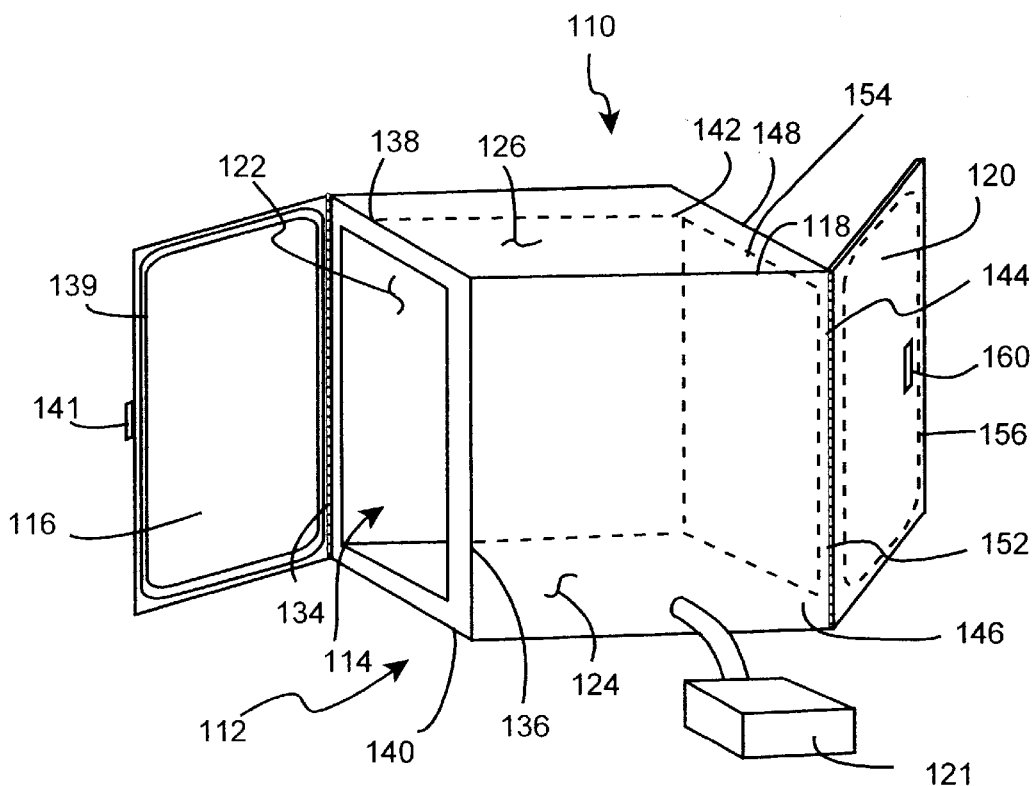
FIG. 5 is a perspective view of an alternate embodiment of the refrigerator of the present invention.

Now, with reference to FIG. 5, a second embodiment of the dual-access refrigerator device 110 of the present invention is shown. By way of overview, the device 110 includes a main housing 112 having an internal compartment 114, a movable front access panel 116 to selectively provide access to the internal compartment, and a rear access aperture 118. The rear access aperture 18 is selectively sealed by a rear access panel 120 movably attached to the main housing 112; the rear access panel provides supplementary access to the internal compartment 114. A cooling means 121 is also provided to adjustably maintain the internal compartment 114 at a desired temperature. The cooling means 121 may be located remote from the main housing 112.

The main housing 112 of the dual-access refrigerator device 110 of the present invention includes a first side wall 122 spaced apart from a second side wall 124 by a top wall 126, and a bottom wall 128. The movable front access panel 116 covers a front access aperture 132 and allows selective access to the internal compartment 114. In a preferred embodiment, the front access panel 116 is sized to extend between the first and second side wall front edges 134,136 and span from the top wall front edge 138 to the bottom wall front edge 140. With continued reference to FIG. 5, the front access panel 116 is preferably an insulated door hingedly attached to the first side wall front edge 134. It is noted that the front access panel 116 may also be attached to the other edges of the rear access aperture, as desired. A front sealing gasket 139 provides a thermal seal between the front access panel 116 and the internal compartment 114. A front handle 141 facilitates opening and shutting of the front access panel 116.

Figure 7:
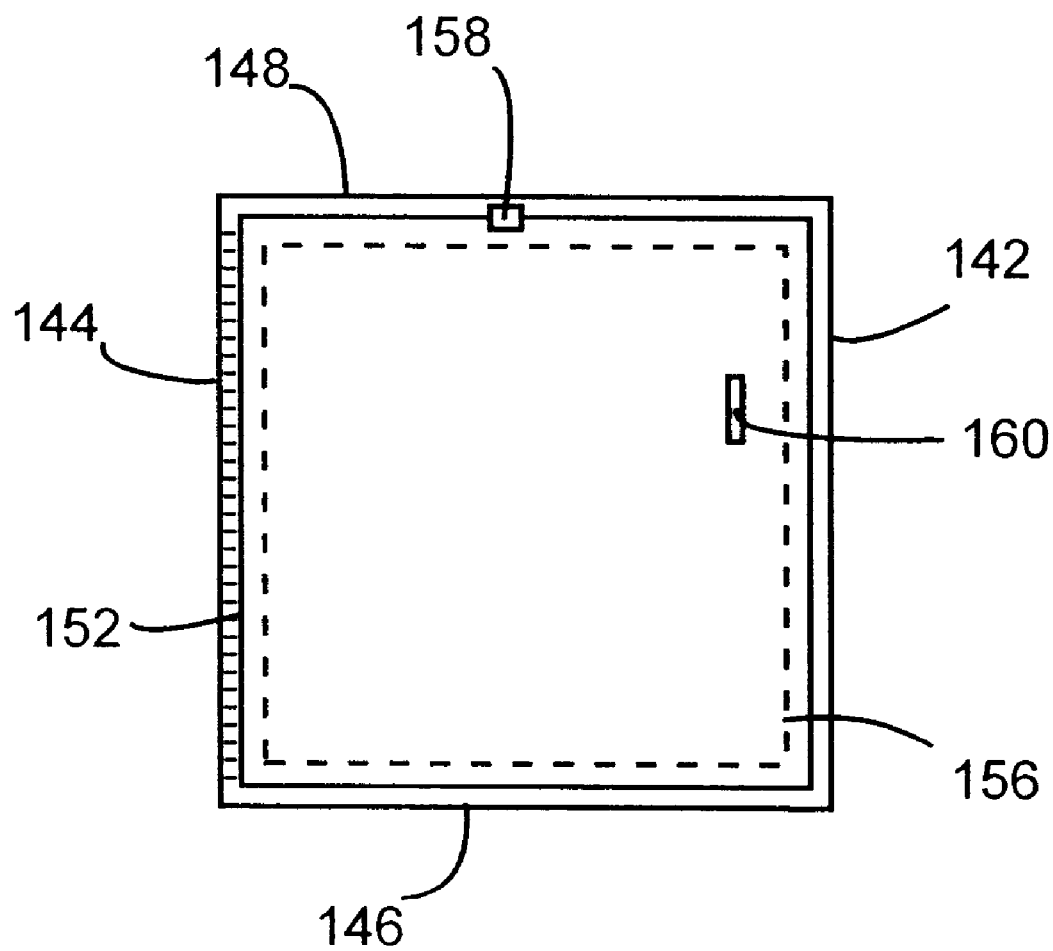
FIG. 7 is a rear elevation view of the refrigerator of FIG. 5.

As seen in FIG. 7, the rear access aperture 118 of the main housing 112 extends from a first side wall rear edge 142 to a second side wall rear edge 144, spanning from a bottom wall rear edge 146 to a top wall rear edge 148. The internal compartment 114 may be reached by opening the rear access panel 120. The rear access panel 120 is an insulated door hingedly attached to the rear access aperture 118. The rear access panel 120 is adapted to open along a vertical linking hinge 152 disposed along a left side edge 150 of the rear access aperture 118. It is noted that the rear access panel 120 may also be attached to the other edges of the rear access aperture 118, as desired. A rear sealing gasket 156 provides a thermal seal between the rear access panel 120 and the internal compartment 114. A rear access panel securing clip 158 may be used to keep the rear access panel 120 in a closed orientation. A rear access panel handle 160 facilitates opening and shutting of the rear access panel 120.

With this arrangement, the present invention provides a refrigerator device 110 that may advantageously be accessed from the front and rear. As a result, the present invention is well-suited for use with a host vehicle 162, such as a motor home or conversion van, in keeping with the objectives of the present invention.

Figure 6:
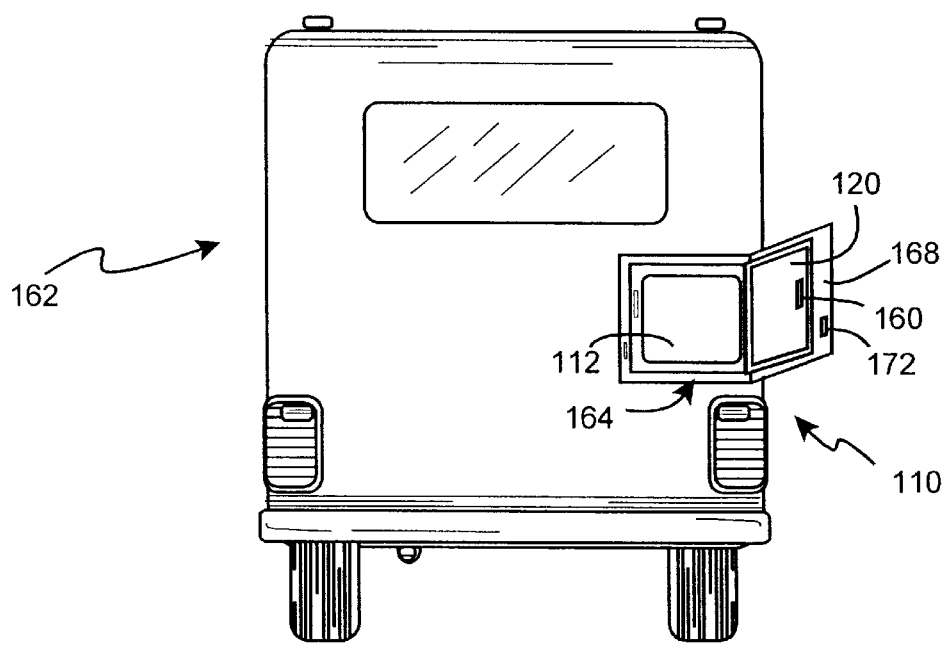
FIG. 6 is a pictorial view of the refrigerator of FIG. 5, shown in use with a host vehicle.

With reference to FIG. 6, the dual-access refrigerator device 110 of the present invention is shown in use within a motor home 162 having a refrigerator access aperture 164 disposed within a vehicle side wall 166. The refrigerator access aperture 164 is selectively closed by a refrigerator access panel 168 movably associated therewith. The refrigerator access panel 168 is attached to the vehicle side wall 166 via a linking hinge 170. A grasping handle 172 facilitates opening and shutting of the refrigerator access panel 168. The refrigerator access panel 168 may also be slid into cooperating tracks, not shown, or attached through other releasable attachment methods, as desired. The main housing is preferably positioned so that the rear access aperture 118 is substantially aligned with the refrigerator access aperture 164, thereby placing the refrigerator access panel 168 in close proximity with the rear access panel 120. With this arrangement, the refrigerator internal compartment 114 may be accessed from outside the host vehicle 162 by opening the refrigerator access panel 168 to expose the rear access panel 120. Opening the rear access panel 120 then provide direct access to the refrigerator internal compartment 114.

Figure 4:
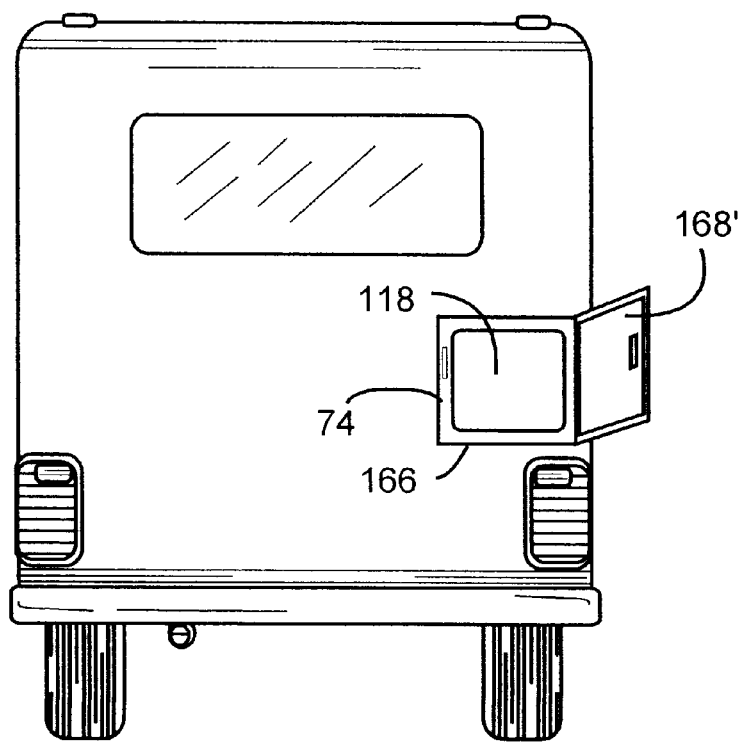
FIG. 4 is a rear pictorial view of an alternate embodiment of the refrigerator of the present invention.

In a third embodiment, shown with supplemental reference to FIG. 4, the refrigerator main housing is constructed without a rear access panel 120, and the rear access aperture 118 is in direct communication with the host vehicle refrigerator access panel 168'. In this embodiment, a contoured sealing partition extends from the perimeter of the rear access aperture 118 to the interior of the vehicle side wall 166, thereby providing a thermal seal between the refrigerator internal compartment 114 and the refrigerator access panel 168'. It is preferred that the refrigerator access panel 68' of this embodiment be insulated.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. In combination, a dual-access refrigerator and a host vehicle, said dual-access refrigerator comprising:

a main housing having an internal compartment, said main housing including a first side wall spaced apart from a second side wall; cooling means for selectively maintaining an internal temperature of said internal compartment;

a front access panel adapted to selectively provide access to said internal compartment;

a front sealing gasket adapted to selectively provide a thermal seal between said front access panel and said internal compartment;

a rear access aperture disposed within said rear wall;

a rear access panel to selectively cover said rear access aperture;

a rear sealing means for selectively providing a thermal seal between said rear access panel and said internal compartment; said rear access panel pivotally attached to said rear wall;

said host vehicle includes a side wall having a refrigerator access aperture disposed therein; and said dual access refrigerator main housing being mounted within said host vehicle, with said rear access aperture and said rear access panel being substantially aligned with said refrigerator access aperture;

whereby said refrigerator access panel selectively provides access to said rear access panel.

2. In combination, a dual-access refrigerator and a host vehicle, said dual-access refrigerator comprising:

a main housing having an internal compartment, said main housing including a first side wall spaced apart from a second side wall by a top wall, a bottom wall, and a rear wall;

cooling means for selectively maintaining an internal temperature of said internal compartment;

a front access panel adapted to selectively provide a thermal seal between said front access panel and said internal compartment;

a rear access aperture disposed within said rear wall;

a rear access panel to selectively cover said rear access aperture;

a rear sealing means for selectively providing s thermal seal between said rear access panel and said internal compartment;

said rear access panel pivotally attached to said rear wall;

said host vehicle includes a side wall having a refrigerator access aperture disposed therein;

said dual access refrigerator main housing being mounted within said host vehicle, with said rear access aperture and said rear access panel being substantially aligned with said refrigerator access aperture;

a refrigerator access panel adapted to selectively cover said refrigerator access aperture;

whereby said refrigerator access panel selectively provides access to said rear access panel.

3. In combination, a dual-access refrigerator and a host vehicle, said dual-access refrigerator comprising:

a main housing having an internal compartment, said main housing including a first side wall spaced apart from a second side wall by a top wall, a bottom wall, and a rear wall;

cooling means for selectively maintaining an internal temperature of said internal compartment;

a front access panel adapted to selectively provide access to said internal compartment;

a front sealing gasket adapted to selectively provide a thermal seal between said front access panel and said internal compartment;

a rear access aperture disposed within said rear wall;

said host vehicle includes a side wall having a refrigerator access aperture disposed therein;

said dual access refrigerator main housing being mounted within said host vehicle, said rear access aperture being substantially aligned with said refrigerator access aperture;

a refrigerator access panel movably attached to said host vehicle side wall, said refrigerator access panel being sized to cover said refrigerator access aperture; and a rear sealing means for selectively providing a thermal seal between said refrigerator access panel and said internal compartment;

whereby said refrigerator access panel selectively provides access to said main internal compartment.

* * * * *